(12) United States Patent
Duvvuru Kamakshi et al.

(10) Patent No.: US 12,086,299 B1
(45) Date of Patent: Sep. 10, 2024

(54) TOUCH INPUT FOR HEAD-MOUNTABLE DEVICES

(71) Applicant: Apple Inc., Cupertino, CA (US)

(72) Inventors: Prashanth Reddy Duvvuru Kamakshi, Cupertino, CA (US); Muhammad F. Hossain, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 5 days.

(21) Appl. No.: 17/353,664

(22) Filed: Jun. 21, 2021

Related U.S. Application Data (60) Provisional application No. 63/054,171, filed on Jul. 20, 2020.

(51) Int. Cl.
| | | |
|---|---|---|
| *G06F 3/01* | (2006.01) | |
| *G02B 27/01* | (2006.01) | |
| *G06F 3/044* | (2006.01) | |
| *G06F 3/04847* | (2022.01) | |
| *G06F 3/0488* | (2022.01) | |
| *H04R 1/02* | (2006.01) | |

(52) U.S. Cl.
CPC .......... *G06F 3/011* (2013.01); *G02B 27/0172* (2013.01); *G06F 3/044* (2013.01); *G06F 3/04847* (2013.01); *G06F 3/0488* (2013.01); *H04R 1/028* (2013.01); *G02B 2027/014* (2013.01); *G06F 2203/04104* (2013.01); *G06F 2203/04105* (2013.01); *H04R 2499/15* (2013.01)

(58) Field of Classification Search
CPC ...... G06F 3/011; G06F 3/044; G06F 3/04847; G06F 3/0488; G06F 2203/04104; G06F 2203/04105; G02B 27/0172; G02B 2027/014; H04R 1/028; H04R 2499/15
See application file for complete search history.

(56) References Cited

U.S. PATENT DOCUMENTS

| | | | |
|---|---|---|---|
| 5,689,253 A | * 11/1997 | Hargreaves | ................ B41J 5/10 400/489 |
| 8,665,177 B2 | 3/2014 | Herrmann et al. | |
| 8,692,778 B2 | * 4/2014 | Kim | ...................... G06F 3/0416 345/173 |
| 8,711,116 B2 | * 4/2014 | Papakipos | ............. G06F 3/0485 345/173 |
| 9,348,364 B2 | * 5/2016 | Papakipos | ............. G06F 3/0485 |
| 9,529,471 B2 | * 12/2016 | Kim | ........................ G06F 3/041 |
| 9,632,578 B2 | * 4/2017 | Bae | ..................... H04W 12/086 |
| 9,772,661 B2 | * 9/2017 | Nakamura | ............ G06F 1/1626 |
| 9,798,399 B2 | * 10/2017 | Vandermeijden | ....... G06F 3/041 |
| 9,946,393 B2 | 4/2018 | Kim et al. | |
| 2010/0079395 A1 | * 4/2010 | Kim | ...................... G06F 1/1626 345/173 |
| 2010/0103098 A1 | * 4/2010 | Gear | ..................... G06F 1/1626 345/158 |

(Continued)

*Primary Examiner* — David D Davis
(74) *Attorney, Agent, or Firm* — BAKERHOSTETLER (57) ABSTRACT

A head-mountable device can be provided with an ability to detect whether a touch input provided to an input detecting element is intentional or unintentional. For example, multiple touch sensors can be provided at different locations on a housing of a head-mountable device. A first one of the touch sensors can be operated to detect a first touch input. A second touch sensor can be operated to detect a second touch input only when the first touch input is detected and/or above a threshold.

19 Claims, 4 Drawing Sheets

(56) References Cited

U.S. PATENT DOCUMENTS

| | | | | |
|---|---|---|---|---|
| 2010/0134423 A1* | 6/2010 | Brisebois | G06F 3/038 |
| | | | 345/173 |
| 2011/0122085 A1* | 5/2011 | Chang | G06F 3/0416 |
| | | | 345/174 |
| 2011/0304574 A1* | 12/2011 | Harrison | G06F 3/016 |
| | | | 345/173 |
| 2011/0312349 A1* | 12/2011 | Forutanpour | G06F 1/1626 |
| | | | 455/566 |
| 2012/0075212 A1* | 3/2012 | Park | G06F 3/04886 |
| | | | 345/173 |
| 2013/0093687 A1* | 4/2013 | Papakipos | G06F 1/169 |
| | | | 345/173 |
| 2013/0300689 A1* | 11/2013 | Park | G06F 3/0488 |
| | | | 345/173 |
| 2013/0332885 A1* | 12/2013 | Ji | G06F 3/0484 |
| | | | 715/833 |
| 2013/0335301 A1* | 12/2013 | Wong | G06F 3/167 |
| | | | 345/8 |
| 2015/0355684 A1* | 12/2015 | Nakamura | G06F 1/1694 |
| | | | 361/679.3 |
| 2016/0055680 A1* | 2/2016 | Kim | G06F 3/0416 |
| | | | 345/633 |
| 2017/0053443 A1* | 2/2017 | Diament | G06F 1/1643 |
| 2018/0217732 A1* | 8/2018 | Wang | G06F 3/0484 |
| 2019/0012962 A1 | 1/2019 | Ha et al. | |

* cited by examiner

TOUCH INPUT FOR HEAD-MOUNTABLE DEVICES

CROSS-REFERENCE TO RELATED APPLICATION

This application claims the benefit of U.S. Provisional Application No. 63/054,171, entitled "TOUCH INPUT FOR HEAD-MOUNTABLE DEVICES," filed Jul. 20, 2020, the entirety of which is incorporated herein by reference.

TECHNICAL FIELD

The present description relates generally to head-mountable devices and, more particularly, to touch input for head-mountable devices.

BACKGROUND

A head-mountable device can be worn by a user to display visual information within the field of view of the user. The head-mountable device can be used as a virtual reality (VR) system, an augmented reality (AR) system, and/or a mixed reality (MR) system. A user may observe outputs provided by the head-mountable device, such as visual information provided on a display. The display can optionally allow a user to observe an environment outside of the head-mountable device. Other outputs provided by the head-mountable device can include speaker output and/or haptic feedback. A user may further interact with the head-mountable device by providing inputs for processing by one or more components of the head-mountable device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mountable devices, such as head-mountable displays, headsets, visors, smartglasses, head-up display, etc., can perform a range of functions that are managed by the components (e.g., sensors, circuitry, and other hardware) included with the wearable device. The head-mountable device can provide a user experience that is immersive or otherwise natural so the user can easily focus on enjoying the experience without being distracted by the mechanisms of the head-mountable device.

It can be desirable to provide a mechanism for a user to provide inputs to a head-mountable device to facilitate user interaction with the head-mountable device. Such inputs can include touch input, where input detecting elements are provided, for example, on an exterior surface (e.g., housing) of the head-mountable device. The input detecting elements can provide an ability for the user to provide instructions to the head-mountable device, which can then perform actions corresponding to the instructions received from the user. It can be desirable to provide easy access to such input detecting elements, so that the user can readily achieve performance of the corresponding actions. However, where input detecting elements are exposed to an external environment, the user or an object can inadvertently and unintentionally activate the input detecting elements, which may cause the head-mountable device to perform the action contrary to the desires of the user. The user may then be required to take steps to terminate or cancel the action. In some cases, the action may be performed without the knowledge of the user and with a result that is not desired by the user.

According to embodiments disclosed herein, head-mountable devices can be provided with an ability to detect whether a touch input provided to an input detecting element is intentional or unintentional. For example, multiple touch sensors can be provided at different locations on a housing of a head-mountable device. A first one of the touch sensors can be operated to detect a first touch input. A second touch sensor can be operated to detect a second touch input only when the first touch input is detected and/or above a threshold.

These and other embodiments are discussed below with reference to FIGS. 1-7. However, those skilled in the art will readily appreciate that the detailed description given herein with respect to these Figures is for explanatory purposes only and should not be construed as limiting.

Figure 1:
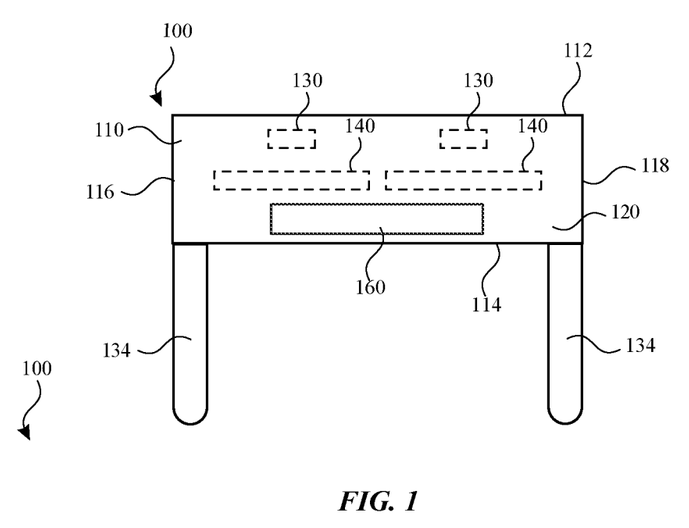
FIG. 1 illustrates a top view of a head-mountable device, according to some embodiments of the present disclosure.

According to some embodiments, for example as shown in FIG. 1, a head-mountable device 100 includes a housing 110 that is worn on a head of a user. The housing 110 can be positioned in front of the eyes of a user to provide information within a field of view of the user. The housing 110 can provide nose pads or another feature to rest on a user's nose. The housing 110 can be supported on a user's head with the securement element 134. The securement element 134 can wrap or extend along opposing sides of a user's head. The securement element 134 can include earpieces for wrapping around or otherwise engaging or resting on a user's ears. It will be appreciated that other configurations can be applied for securing the head-mountable device 100 to a user's head. For example, one or more bands, straps, belts, caps, hats, or other components can be used in addition to or in place of the illustrated components of the head-mountable device 100. By further example, the securement element 134 can include multiple components to engage a user's head.

The housing 110 can provide structure around a peripheral region thereof to support any internal components of the housing 110 in their assembled position. For example, the housing 110 can enclose and support various internal components (including for example integrated circuit chips, processors, memory devices and other circuitry) to provide computing and functional operations for the head-mountable device 100, as discussed further herein. Any number of components can be included within and/or on the housing 110 and/or the securement element 134.

The housing 110 can include and/or define an outer side 112 and an inner side 114, opposite the outer side 112. As used herein, an outer side 112 of a portion of a head-mountable device is a side that faces away from the user and/or towards an external environment. As used herein, an inner side of a portion of a head-mountable device is a side that faces toward the user and/or away from the external environment. The housing 110 can further include and/or define a left side 116 and a right side 118, opposite the left side 116. The housing 110 can further include and/or define a top side 120 and a bottom side 122 (not shown in FIG. 1), opposite the top side 120. As used herein, the terms "left," "right," "top," and "bottom" each refer to the perspective of the user while wearing and/or operating the head-mountable device 100. It will be understood that such sides need not be planar and need not be distinctly defined relative to each other by edges and/or corners. As such, any given side can transition to an adjacent side. Any number of sides can be provided. It will be recognized that opposing sides can allow a user to grasp the head-mountable device at each of the opposing sides to controllably hold, move, adjust, and operate the head-mountable device.

The housing 110 can include and/or support one or more cameras 130. The cameras 130 can be positioned on or near the outer side 112 of the housing 110 to capture images of views external to the head-mountable device 100. The captured images can be used for display to the user or stored for any other purpose.

The head-mountable device can be provided with one or more displays 140 that provide visual output for viewing by a user wearing the head-mountable device. As shown in FIG. 1, one or more optical modules containing displays 140 can be positioned on the inner side 114 of the housing 110. For example, a pair of optical modules can be provided, where each optical module is movably positioned to be within the field of view of each of a user's two eyes. Each optical module can be adjusted to align with a corresponding eye of the user. Movement of each of the optical modules can match movement of a corresponding camera 130. Accordingly, the optical module is able to accurately reproduce, simulate, or augment a view based on a view captured by the camera 130 with an alignment that corresponds to the view that the user would have naturally without the head-mountable device 100.

A display 140 can transmit light from a physical environment (e.g., as captured by a camera) for viewing by the user. Such a display can include optical properties, such as lenses for vision correction based on incoming light from the physical environment. Additionally or alternatively, a display 140 can provide information as a display within a field of view of the user. Such information can be provided to the exclusion of a view of a physical environment or in addition to (e.g., overlaid with) a physical environment.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As further shown in FIG. 1, the head-mountable device 100 can include multiple touch sensors, such as a second touch sensor 160. Each of the touch sensors can receive touch input from a user. One or more touch sensors can be provided on an exterior surface of the head-mountable device 100, such as on the housing 110. The touch sensors can be provided on the outer side 112, the inner side 114, left side 116, right side 118, top side 120, and/or the bottom side 122 (not shown in FIG. 1). It will be understood that the touch sensors can be provided at any portion of the head-mountable device 100, including any portion of the housing 110 and/or on the securement element 134. It will be further understood that multiple touch sensors can be provided by the head-mountable device 100. For example, separate touch sensors can be provided on a same side, different sides, and/or opposing sides of the head-mountable device 100.

Figure 2:
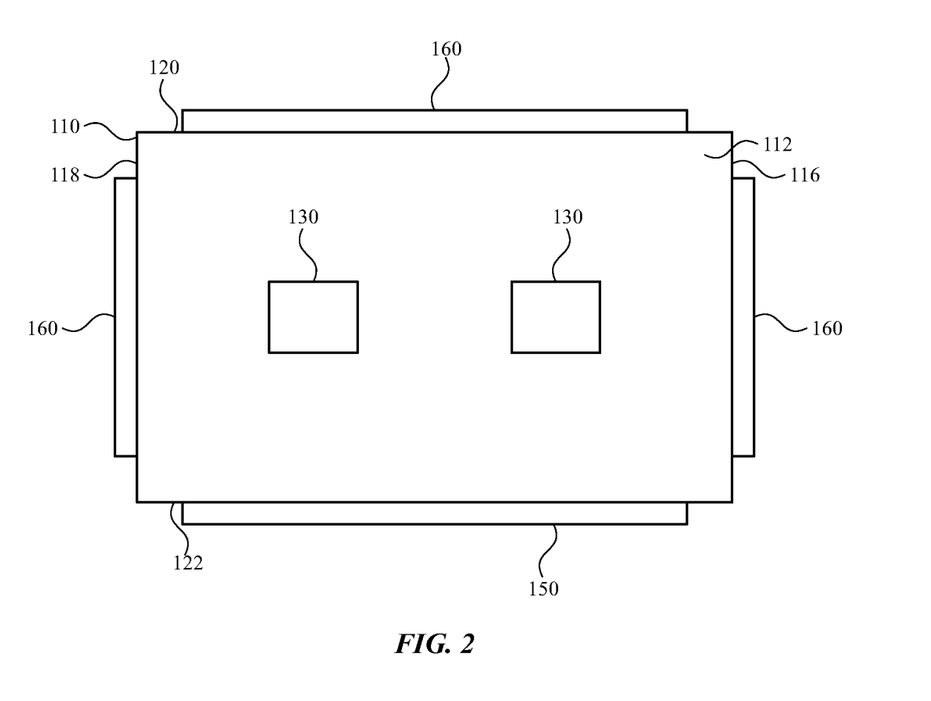
FIG. 2 illustrates a front view of a head-mountable device, according to some embodiments of the present disclosure.

FIG. 2 illustrates a front view of a head-mountable device, according to some embodiments of the present disclosure. As shown in FIG. 2, a head-mountable device 100 can include multiple touch sensors 150 and/or 160 distributed different sides of the housing 110. For example, a touch sensor can be positioned at one or more of left side 116, right side 118, top side 120, and/or the bottom side 122. At least two of the touch sensors can be on the same side, different sides, and/or opposing sides of the head-mountable device 100.

Further shown in FIG. 2, the touch sensors can include one or more first touch sensors 150 and one or more second touch sensors 160. The touch sensor 150 can be operated to detect a first touch input, such as a touch input that verify that a user is grasping the head-mountable device 100. The second touch sensor 160 can be operated to detect a second touch input, such as an instruction from a user that is provided while the user is grasping the head-mountable device 100. The detection of the first touch input can operate as a gating function that applies a threshold to determine whether the second touch input was intentional, as described further herein.

While the first touch sensor 150 is shown at the bottom side 122 and the second touch sensors 160 are shown at the left side 116, the right side 118, and the top side 120, it will be understood that any arrangement of such touch sensors is contemplated. For example, one or more first touch sensors 150 can be provided at any one or more of the sides. By further example, one or more second touch sensors 160 can be provided at any one or more of the sides. At least one first touch sensor 150 can be positioned on a side that is different from a side at which a second touch sensor 160 is positioned. In some examples, a first touch sensor 150 is on a side that is opposite a side at which a second touch sensor 160 is positioned.

The touch sensors can include one or more contact sensors, capacitive sensors, strain gauges, resistive touch sensors, piezoelectric sensors, cameras, pressure sensors, photodiodes, and/or other sensors operable to detect a touch input. In some embodiments, the first touch sensor 150 can detect a magnitude of force applied thereto by a user. In some embodiments, the second touch sensor 160 can detect a position and/or movement (e.g., direction and speed) of a touch applied thereto by a user. Each of the touch sensors can detect multiple touch inputs simultaneously (e.g., at different regions thereof), and/or multiple touch sensors can be provided.

Figure 3:
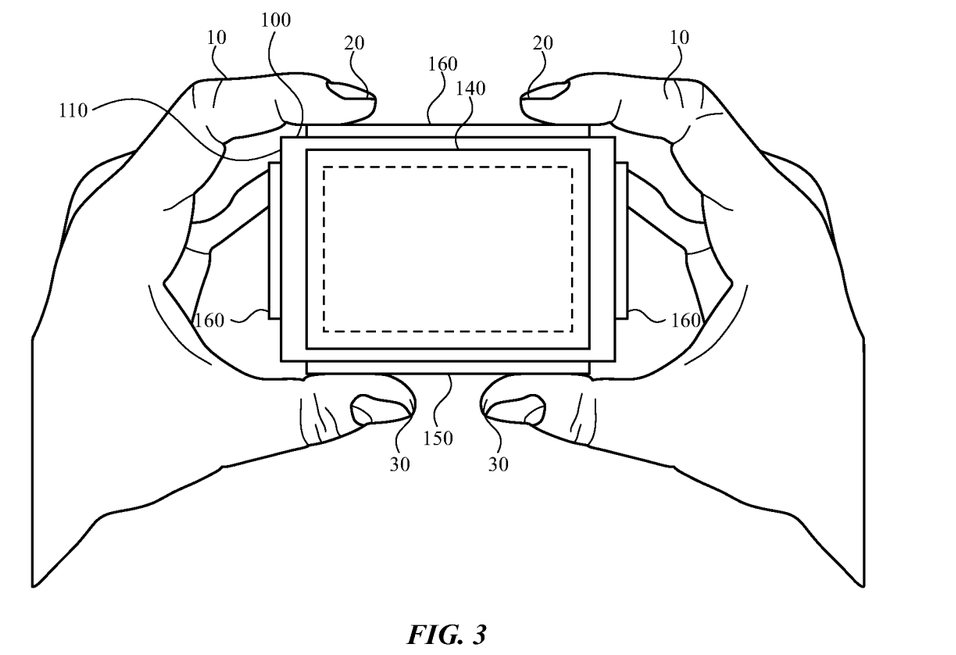
FIG. 3 illustrates a rear view of a head-mountable device operated by a user, according to some embodiments of the present disclosure.

FIG. 3 illustrates a rear view of a head-mountable device operated by a user, according to some embodiments of the present disclosure. As shown in FIG. 3, a user can grasp the head-mountable device 100 by one or both hands 10. While the user can grasp the head-mountable device 100 and variety of configurations, a natural configuration can include one in which at least one first finger 30 or other appendage is positioned at a first touch sensor 150, and at least one second finger 20 or other appendage is positioned at a second touch sensor 160. The presence, force, and/or movement of the first finger 30 can be detected by the first touch sensor 150. The presence, force, and/or movement of the second finger 20 can be detected by the second touch sensor 160. By operating in concert, the first touch sensor 150 can verify the grasp of the user and interpret the touch input at the second touch sensor 160 as being intentional. Corresponding actions can then be taken, as described further herein.

Figure 4:
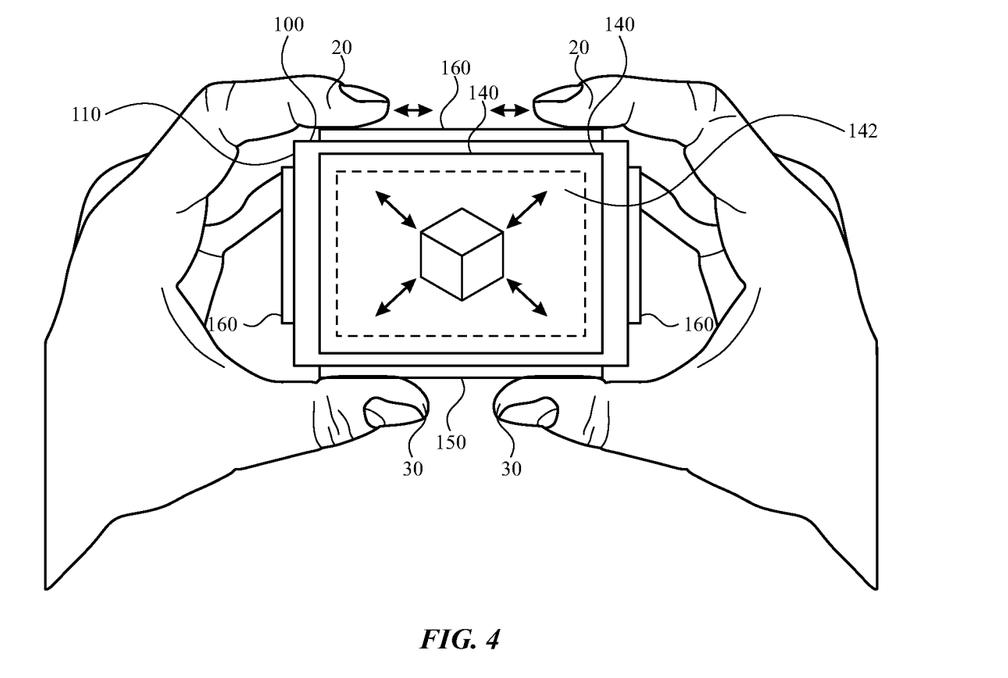
FIG. 4 illustrates a rear view of a head-mountable device operated by a user, the head-mountable device providing a user interface, according to some embodiments of the present disclosure.
Figure 5:
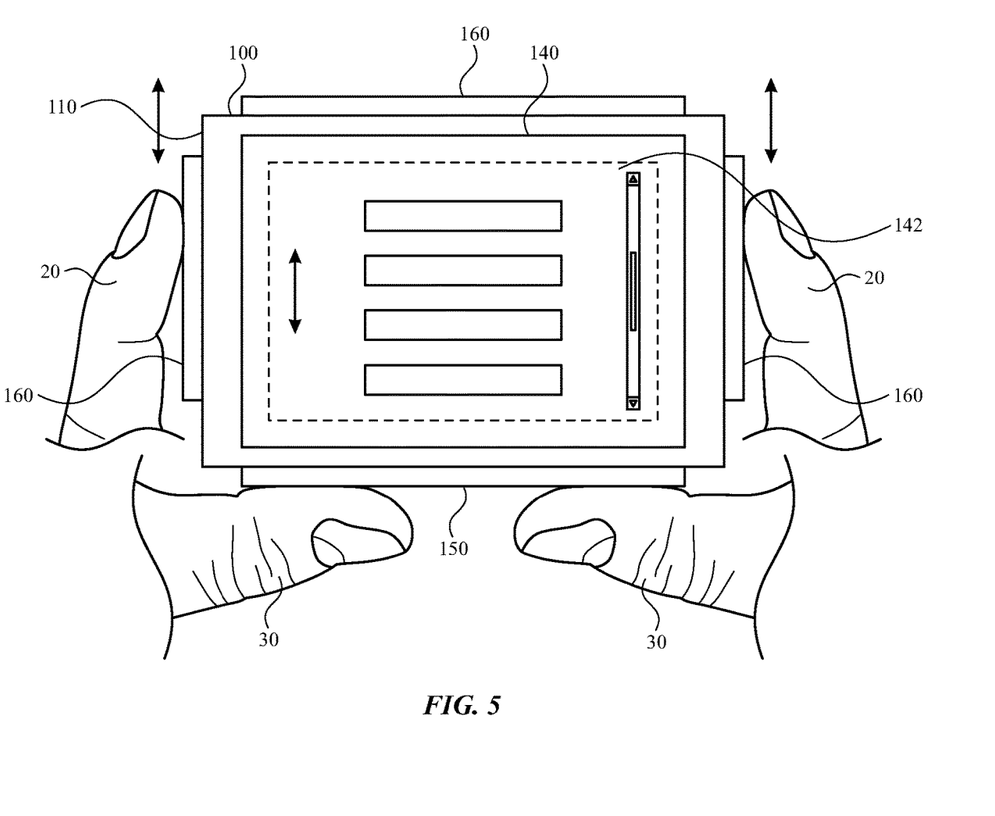
FIG. 5 illustrates a rear view of a head-mountable device operated by a user, the head-mountable device providing a user interface, according to some embodiments of the present disclosure.

Referring now to FIGS. 4 and 5, touch inputs provided by user can be received by head-mountable device that performs certain actions in response to and based on the touch inputs. The examples provided herein are my illustration only, and not by limitation. It will be understood that a variety of actions can be performed based on one or more of the touch inputs detected by the head-mountable device.

As shown in FIGS. 4 and 5, the second touch sensor 160 can be used to detect a sliding gesture by the user. Multiple sensing elements of the second touch sensor 160 along the surface thereof can be used in concert to detect particular user inputs. For example, as a user applies a finger at a first region, the second touch sensor 160 can detect the resulting effect (e.g., capacitance) that is induced in a corresponding first sensing element of the second touch sensor 160. The user can subsequently move the finger to a second part of the second touch sensor 160, and the second touch sensor 160 can detect the resulting effect (e.g., capacitance) that is induced in the corresponding second sensing element of the second touch sensor 160. The sequence of inputs within a span of time can be interpreted by the head-mountable device 100 as a user's motion gesture in a particular direction (e.g., in a direction along a line or path defined by the distribution of the sensing elements). For example, the sequence of (1) a detected effect (e.g., capacitance) in the first sensing element and then (2) a detected effect (e.g., capacitance) and the second sensing element can be interpreted as a user motion gesture in a first direction. The sequence of (1) a detected effect (e.g., capacitance) and the second sensing element and then (2) a detected effect (e.g., capacitance) in the first sensing element can be interpreted as a user motion gesture in a second direction, opposite the first direction. Detected sliding gestures can be correlated with preprogrammed actions to be performed by the head-mountable device 100, as described further herein.

Additionally or alternatively, the second touch sensor 160 can be used to detect a tap, double tap, triple tap, or another tap gesture by the user. For example, as a user applies a finger at the first touch sensor 150, the head-mountable device 100 can detect the resulting effect (e.g., capacitance) that is induced in the second touch sensor 160. The user can subsequently lift the finger, and the head-mountable device 100 can detect the resulting effect (e.g., capacitance) or change in effect (e.g., capacitance) that is induced in the second touch sensor 160. The user can subsequently return the finger to the second touch sensor 160, and the head-mountable device 100 can detect the resulting effect (e.g., capacitance) or change in effect (e.g., capacitance) that is induced in the second touch sensor 160. The sequence of inputs within a span of time can be interpreted by the head-mountable device 100 as a user's tap gesture. Detected tap gestures can be correlated with preprogrammed functions to be performed by the head-mountable device 100, as described further herein.

FIG. 4 illustrates a rear view of a head-mountable device operated by a user, the head-mountable device providing a user interface, according to some embodiments of the present disclosure. As shown in FIG. 4, the presence, force, and/or movement of the first finger 30 can be detected by the first touch sensor 150. The presence, force, and/or movement of the second finger 20 can be detected by the second touch sensor 160. Gestures at the second touch sensor 160 can be interpreted as touch inputs when the first touch sensor 150 also detects an input. In response, the head-mountable device can perform a corresponding action.

For example, the display 140 can provide a user interface 142. Not all of the depicted graphical elements may be used in all implementations, however, and one or more implementations may include additional or different graphical elements than those shown in the figure. Variations in the arrangement and type of the graphical elements may be made without departing from the spirit or scope of the claims as set forth herein. Additional components, different components, or fewer components may be provided.

The user interface 142 can be altered somewhat based on detection of touch inputs. For example, movement detected as touch inputs by the second touch sensor 160 can cause the head-mountable device 100 to alter the user interface 142 in a manner that corresponds to the detected movement. By further example, one or more visual features of the user interface 142 can move in a manner (e.g., direction, speed, etc.) that corresponds to the detected movement.

FIG. 5 illustrates a rear view of a head-mountable device operated by a user, the head-mountable device providing a user interface, according to some embodiments of the present disclosure. As shown in FIG. 5, the presence, force, and/or movement of the first finger 30 can be detected by the first touch sensor 150. The presence, force, and/or movement of the second finger 20 can be detected by the second touch sensor 160. Gestures at the second touch sensor 160 can be interpreted as touch inputs when the first touch sensor 150 also detects an input. In response, the head-mountable device can perform a corresponding action.

For example, the user interface 142 can be altered somewhat based on detection of touch inputs. For example, sliding gestures detected as touch inputs by the second touch sensor 160 can cause the head-mountable device 100 to scroll through a list of menu items. A tap detected as a touch input by the second touch sensor 160 can cause the head-mountable device 100 to perform an action corresponding to a selected one of the menu items from the list.

It will be understood that any number of actions can be performed based on preprogrammed or user selectable configurations, in which touch inputs are correlated with corresponding actions. According to some embodiments, the action can include changing a setting of the head-mountable device 100. For example, the head-mountable device 100 can change volume, brightness, display zoom, or other features of the head-mountable device 100 to an extent that corresponds to the characteristic of the touch input. By further example, sliding gestures can be interpreted as a touch input to change a characteristic of the user interface. One or more taps can be interpreted as a user input to change a characteristic of the user interface. One or more taps can be interpreted as a user input to capture an image with the cameras. By further example, one or more sliding gestures and/or taps can be interpreted as a touch input to perform functions on the external device, such as a copy function, a paste function, an undo function, and/or a redo function.

Figure 6:
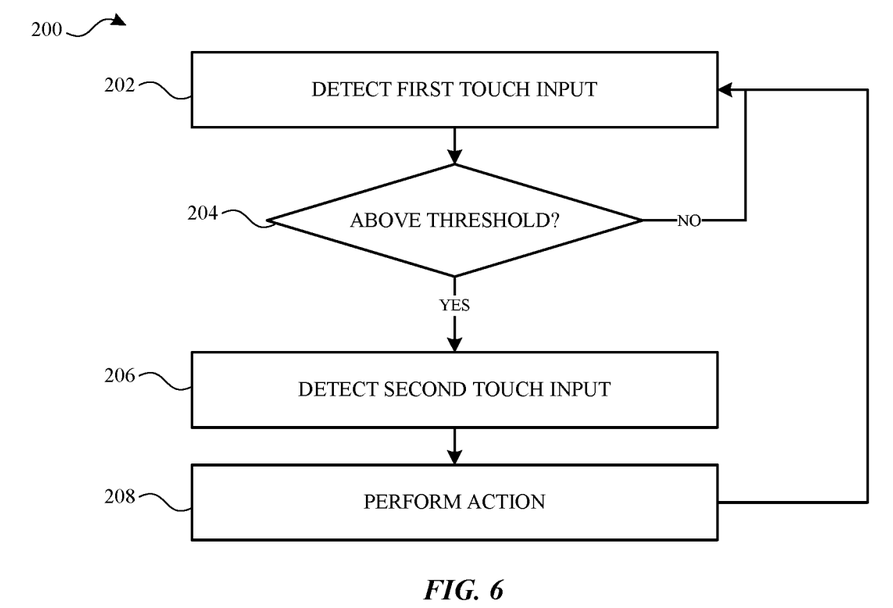
FIG. 6 illustrates a flow chart for a process having operations performed by a head-mountable device, according to some embodiments of the present disclosure.

FIG. 6 illustrates a flow diagram of an example process 200 for responding to touch inputs. For explanatory purposes, the process 200 is primarily described herein with reference to the head-mountable device 100. However, the process 200 is not limited to the head-mountable device 100, and one or more blocks (or operations) of the process 200 may be performed by one or more other components or chips of the head-mountable device 100. The head-mountable device 100 also is presented as an exemplary device and the operations described herein may be performed by any suitable device. Further for explanatory purposes, the blocks of the process 200 are described herein as occurring in serial, or linearly. However, multiple blocks of the process 200 may occur in parallel. In addition, the blocks of the process 200 need not be performed in the order shown and/or one or more blocks of the process 200 need not be performed and/or can be replaced by other operations.

The process 200 can begin when a first touch input is detected by a first touch sensor of a head-mountable device (202). One or more characteristics (e.g., force) of the first touch input can be evaluated. For example, the first touch input can be compared to a threshold to determine whether the first touch input exceeds the threshold (204). Where the first touch input does not exceed the threshold, the process 200 can return to the beginning and/or no further action may be performed. Where the first touch input does exceed the threshold, the process 200 can proceed to determine whether a second touch input is detected (206). Where a second touch input is detected, for example by a second touch sensor, the second touch input can be evaluated to determine whether a corresponding action exists. Where the second touch input is correlated with an action, the head-mountable device can perform the action (208), as described herein. Accordingly, the detection of the first touch input can be a gating mechanism that prevents inadvertent detection of second touch inputs to result in performance of an action when the user does not intend for such action to be performed.

Figure 7:
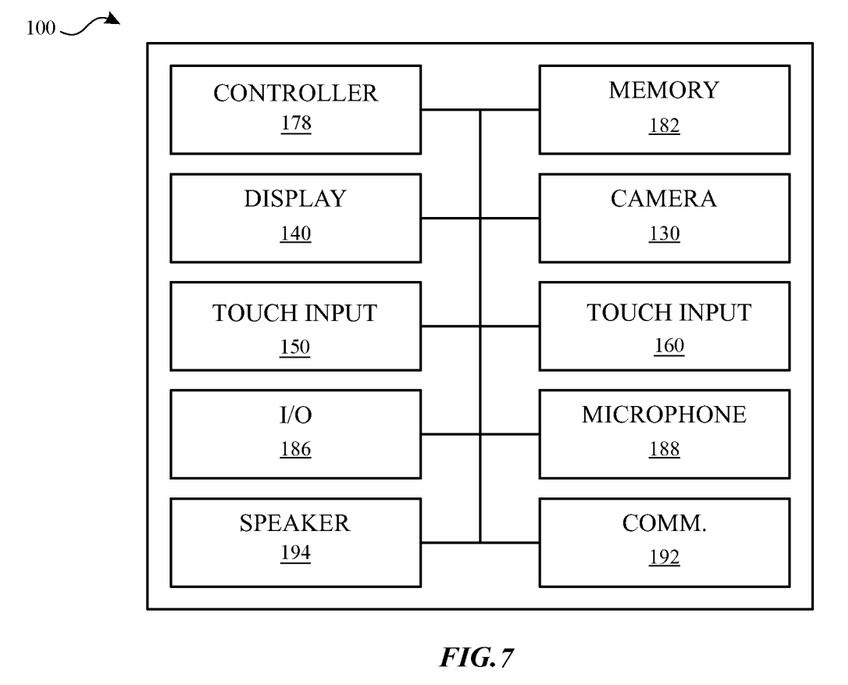
FIG. 7 illustrates a block diagram of a head-mountable device, in accordance with some embodiments of the present disclosure.

Referring now to FIG. 7, components of the head-mountable device can be operably connected to provide the performance described herein. FIG. 7 shows a simplified block diagram of an illustrative head-mountable device 100 in accordance with one embodiment of the invention. It will be understood that additional components, different components, or fewer components than those illustrated may be utilized within the scope of the subject disclosure.

As shown in FIG. 7, the head-mountable device 100 can include a controller 178 (e.g., control circuitry) with one or more processing units that include or are configured to access a memory 182 having instructions stored thereon. The instructions or computer programs may be configured to perform one or more of the operations or functions described with respect to the head-mountable device 100. The controller 178 can be implemented as any electronic device capable of processing, receiving, or transmitting data or instructions. For example, the controller 178 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 182 can store electronic data that can be used by the head-mountable device 100. For example, the memory 182 can store electrical data or content such as, for example, audio and video files, documents and applications, device settings and user preferences, timing and control signals or data for the various modules, data structures or databases, and so on. The memory 182 can be configured as any type of memory. By way of example only, the memory 182 can be implemented as random access memory, read-only memory, Flash memory, removable memory, or other types of storage elements, or combinations of such devices.

The head-mountable device 100 can further include a display 140 for displaying visual information for a user. The display 140 can provide visual (e.g., image or video) output. The display 140 can be or include an opaque, transparent, and/or translucent display. The display 140 may have a transparent or translucent medium through which light representative of images is directed to a user's eyes. The display 140 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The head-mountable device 100 can include an optical subassembly configured to help optically adjust and correctly project the image-based content being displayed by the display 140 for close up viewing. The optical subassembly can include one or more lenses, mirrors, or other optical devices.

The head-mountable device 100 can include one or more touch sensors 150 and 160, as described herein. The head-mountable device 100 can include one or more other sensors. Such sensors can be configured to sense substantially any type of characteristic such as, but not limited to, images, pressure, light, touch, force, temperature, position, motion, and so on. For example, the sensor can be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. By further example, the sensor can be a bio-sensor for tracking biometric characteristics, such as health and activity metrics. Other user sensors can perform facial feature detection, facial movement detection, facial recognition, eye tracking, user mood detection, user emotion detection, voice detection, etc. Sensors can include a camera that can capture image based content of the outside world.

The head-mountable device 100 can include an input/output component 186, which can include any suitable component for connecting head-mountable device 100 to other devices. Suitable components can include, for example, audio/video jacks, data connectors, or any additional or alternative input/output components. The input/output component 186 can include buttons, keys, or another feature that can act as a keyboard for operation by the user.

The head-mountable device 100 can include the microphone 188 as described herein. The microphone 188 can be operably connected to the controller 178 for detection of sound levels and communication of detections for further processing, as described further herein.

The head-mountable device 100 can include the speakers 194 as described herein. The speakers 194 can be operably connected to the controller 178 for control of speaker output, including sound levels, as described further herein.

The head-mountable device 100 can include communications circuitry 192 for communicating with one or more servers or other devices using any suitable communications protocol. For example, communications circuitry 192 can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. Communications circuitry 192 can also include an antenna for transmitting and receiving electromagnetic signals.

The head-mountable device 100 can include a battery, which can charge and/or power components of the head-mountable device 100. The battery can also charge and/or power components connected to the head-mountable device 100.

While some embodiments of touch-based input devices disclosed herein relate to head-mountable devices, it will be appreciated that the subject technology can encompass and be applied to other devices. For example, an input device (e.g., crown module) in accordance with embodiments disclosed herein can include a phone, a tablet computing device, a mobile computing device, a watch, a laptop computing device, a mouse, a game controller, a remote control, a digital media player, a head-mountable device, and/or any other electronic device. Further, the external device can be any device that interacts with a touch-based input device. For example, an external device in accordance with embodiments disclosed herein can include a tablet, a phone, a laptop computing device, a desktop computing device, a wearable device, a mobile computing device, a tablet computing device, a display, a television, a phone, a digital media player, and/or any other electronic device.

Accordingly, embodiments of the present disclosure provide a head-mountable device that can be provided with an ability to detect whether a touch input provided to an input detecting element is intentional or unintentional. For example, multiple touch sensors can be provided at different locations on a housing of a head-mountable device. A first one of the touch sensors can be operated to detect a first touch input. A second touch sensor can be operated to detect a second touch input only when the first touch input is detected and/or above a threshold.

Various examples of aspects of the disclosure are described below as clauses for convenience. These are provided as examples, and do not limit the subject technology.

Clause A: a head-mountable device comprising: a housing; a first touch sensor on a first side of the housing and configured to detect a first touch input; a second touch sensor on a second side of the housing, opposite the first side of the housing, the second touch sensor being configured to detect a second touch input; and a processor configured to perform an action based on a second touch input, the second touch input being detected while the first touch sensor detects the first touch input.

Clause B: a head-mountable device comprising: a display configured to provide a user interface; a first touch sensor configured to detect whether a first touch input exceeds a threshold; a second touch sensor configured to detect a change in a second touch input; and a processor configured to alter a visual feature of the user interface based on the change in the second touch input only when the first touch input exceeds the threshold.

Clause C: a method of operating a head-mountable device, the method comprising: detecting a first touch input on a first touch sensor of the head-mountable device; while the first touch input exceeds a threshold, detecting a second touch input on a second touch sensor of the head-mountable device; perform an action based on the second touch input.

One or more of the above clauses can include one or more of the features described below. It is noted that any of the following clauses may be combined in any combination with each other, and placed into a respective independent clause, e.g., clause A, B, or C.

Clause 1: a head securement element extending from the housing; a display on an inner side of the housing; a camera on an outer side of the housing; a speaker; and a microphone.

Clause 2: a display configured to provide a user interface, wherein the action comprises altering a visual feature of the user interface.

Clause 3: the first side is a bottom side of the housing and the second side is a top side of the housing.

Clause 4: the first side is a left side of the housing and the second side is a right side of the housing.

Clause 5: the first touch sensor is a strain gauge and the second touch sensor is a capacitive sensor.

Clause 6: the action comprises altering a setting of the head-mountable device.

Clause 7: the second touch sensor is configured to detect touch input at each of multiple regions thereof.

Clause 8: a third touch sensor on a third side of the housing, the third side connecting the first side to the second side, the processor being further configured to perform an additional action based on the third touch input, the third touch input being detected while the first touch sensor detects the first touch input.

Clause 9: a fourth touch sensor on a fourth side of the housing, opposite the third side of the housing, the fourth touch sensor being configured to detect a fourth touch input, the processor being further configured to perform the additional action based on fourth touch input, the fourth touch input being detected while the first touch sensor detects the first touch input.

Clause 10: the threshold is a force threshold.

Clause 11: the first touch sensor is a strain gauge.

Clause 12: the first touch sensor is on a first side of a housing of the head-mountable device; and a second touch sensor is on a second side of the housing, opposite the first side of the housing.

Clause 13: the processor is further configured to alter the visual feature by moving the visual feature in a direction that corresponds to the change in the second touch input.

Clause 14: the second touch input corresponds to movement across the first touch sensor.

Clause 15: the threshold is a force threshold.

Clause 16: the action comprises altering alter a visual feature of a user interface provided by a display of the head-mountable device.

Clause 17: the action comprises altering a setting of the head-mountable device.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like can refer to an arbitrary housing of reference, an ordinary gravitational housing of reference, and/or a frame of reference provided by a user wearing and/or operating the device.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A head-mountable device comprising:
   a housing;
   a first touch sensor on a first side of the housing and configured to detect a first touch input;
   a second touch sensor on a second side of the housing, opposite the first side of the housing, the second touch sensor being configured to detect a second touch input comprising a tap gesture defined by a sequence, within a span of time, of a detected application of an object at the second touch sensor, a detected lift of the object from the second touch sensor, and a detected return of the object to the second touch sensor; and
   a processor configured to:
      in response to a detection that the first touch input is not provided, prevent the second touch sensor from detecting the second touch input while the first touch input is not provided;
      operate the second touch sensor to detect the second touch input if and only if the first touch input is detected; and
      perform an action based on the tap gesture if and only if the second touch input and the first touch input are detected simultaneously, such that the first touch input is detected at the first touch sensor while the second touch input is detected at the second touch sensor.

2. The head-mountable device of claim 1, further comprising:
   a securement element extending from the housing and for securing the head-mountable device to a head;

a display on an inner side of the housing;
a camera on an outer side of the housing, wherein the first touch sensor and the second touch sensor are on corresponding additional sides of the housing that are between the inner side and the outer side of the housing;
a speaker; and
a microphone.

3. The head-mountable device of claim 1, further comprising a display configured to provide a user interface, wherein the action comprises altering a visual feature of the user interface.

4. The head-mountable device of claim 1, wherein the first side is a bottom side of the housing and the second side is a top side of the housing.

5. The head-mountable device of claim 1, wherein the first side is a left side of the housing and the second side is a right side of the housing.

6. The head-mountable device of claim 1, wherein the first touch sensor is a strain gauge and the second touch sensor is a capacitive sensor.

7. The head-mountable device of claim 1, wherein the action comprises altering a setting of the head-mountable device.

8. The head-mountable device of claim 1, wherein the second touch sensor is configured to detect touch input at each of multiple regions thereof.

9. The head-mountable device of claim 1, further comprising a third touch sensor on a third side of the housing, the third side connecting the first side to the second side, the processor being further configured to perform an additional action based on a third touch input, the third touch input being detected while the first touch sensor detects the first touch input.

10. The head-mountable device of claim 9, further comprising a fourth touch sensor on a fourth side of the housing, opposite the third side of the housing, the fourth touch sensor being configured to detect a fourth touch input, the processor being further configured to perform the additional action based on fourth touch input, the fourth touch input being detected while the first touch sensor detects the first touch input.

11. A head-mountable device comprising:
a display configured to provide a user interface;
a first touch sensor configured to detect whether a first touch input exceeds a threshold;
a second touch sensor configured to detect a change in a second touch input, the change in the second touch input defined by a sequence, within a span of time, of a detected application of an object at the second touch sensor, a detected lift of the object from the second touch sensor, and a detected return of the object to the second touch sensor; and
a processor configured to:
in response to a detection that the first touch input does not exceed the threshold, prevent the second touch sensor from detecting the second touch input while the first touch input does not exceed the threshold;
operate the second touch sensor to detect the second touch input if and only if the first touch input exceeds the threshold; and
alter a visual feature of the user interface based on the change in the second touch input if and only if the change in the second touch input is detected simultaneous with the first touch input exceeding the threshold, such that the first touch input is detected at the first touch sensor while the second touch input is detected at the second touch sensor.

12. The head-mountable device of claim 11, wherein the threshold is a force threshold.

13. The head-mountable device of claim 11, wherein the first touch sensor is a strain gauge.

14. The head-mountable device of claim 11, wherein:
the first touch sensor is on a first side of a housing of the head-mountable device; and
the second touch sensor is on a second side of the housing, opposite the first side of the housing.

15. The head-mountable device of claim 11, wherein the processor is further configured to alter the visual feature by moving the visual feature in a direction that corresponds to the change in the second touch input.

16. A method of operating a head-mountable device, the method comprising:
detecting a first touch input on a first touch sensor of the head-mountable device;
in response to a detection that the first touch input does not exceed a threshold, preventing a second touch sensor from detecting a second touch input while the first touch input does not exceed the threshold;
if and only if the first touch input exceeds the threshold, operating the second touch sensor of the head-mountable device to detect the second touch input, the second touch input comprising a tap gesture defined by a sequence, within a span of time, of a detected application of an object at the second touch sensor, a detected lift of the object from the second touch sensor, and a detected return of the object to the second touch sensor; and
performing an action based on the tap gesture only if the second touch input is detected simultaneous with the first touch input exceeding the threshold, such that the first touch input is detected at the first touch sensor while the second touch input is detected at the second touch sensor.

17. The method of claim 16, wherein the threshold is a force threshold.

18. The method of claim 16, wherein the action comprises altering alter a visual feature of a user interface provided by a display of the head-mountable device.

19. The method of claim 16, wherein the action comprises altering a setting of the head-mountable device.

* * * * *